W. B. OWEN.
TIRE FASTENING DEVICE.
APPLICATION FILED FEB. 11, 1910.
974,178.
Patented Nov. 1, 1910.
2 SHEETS—SHEET 2.
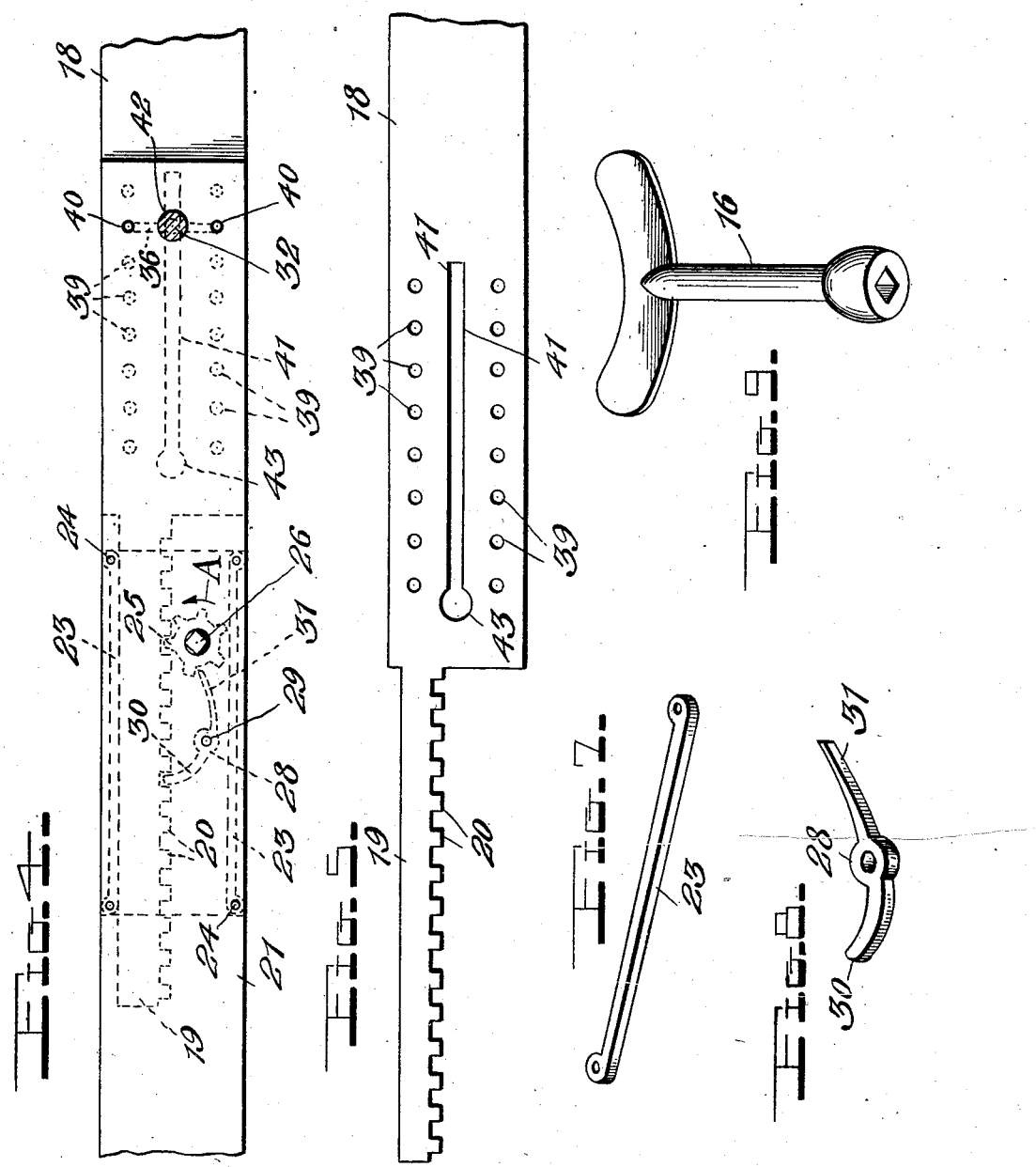
Witnesses
Chas. L. Griesbauer
E. M. Ricketts
Inventor
W. B. Owen,
By Watson E. Coleman
Attorney

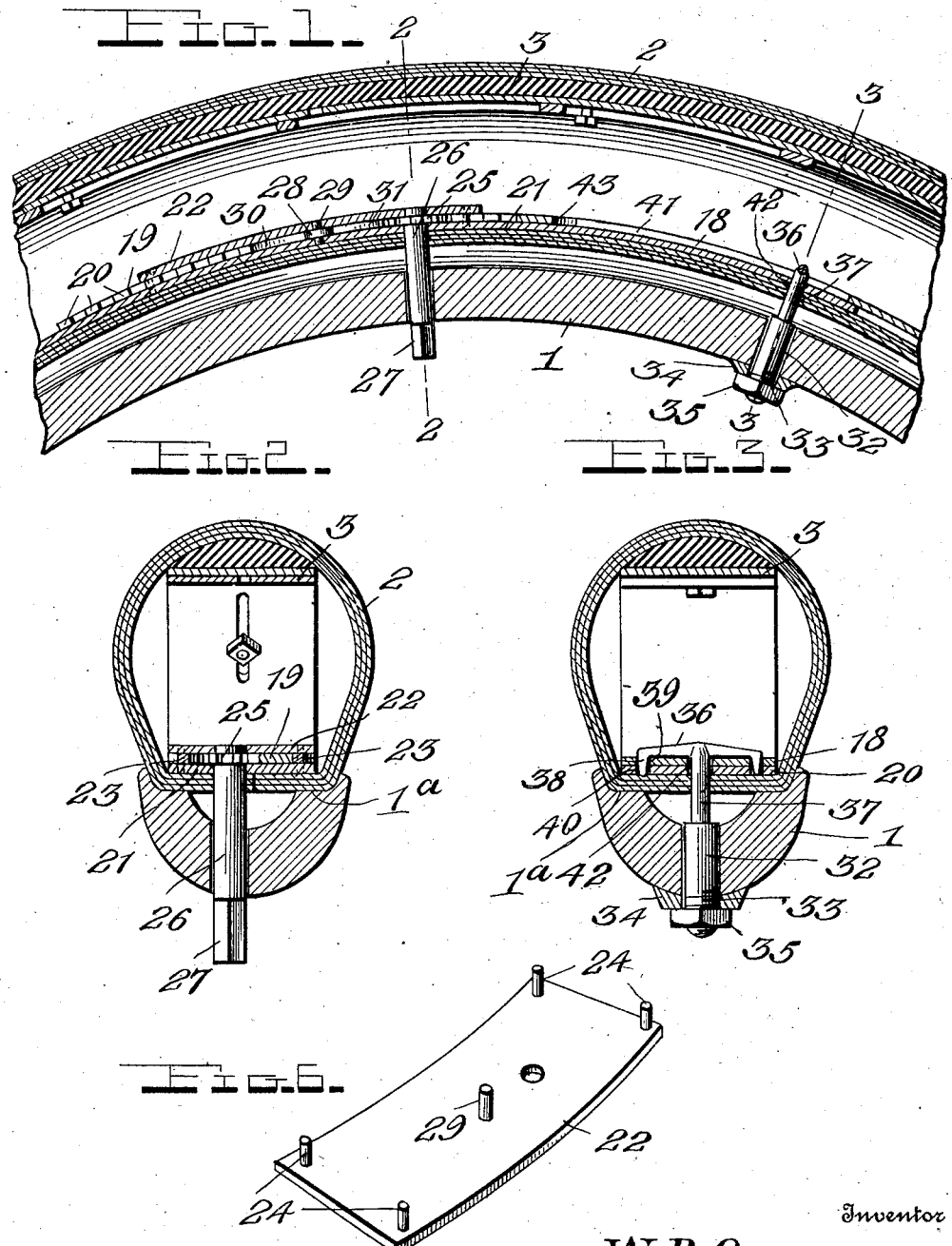

UNITED STATES PATENT OFFICE.

WILLIAM BRANCH OWEN, OF PRICE, UTAH.

TIRE-FASTENING DEVICE.

974,178.  Specification of Letters Patent.  Patented Nov. 1, 1910.

Application filed February 11, 1910. Serial No. 543,398.

*To all whom it may concern:*

Be it known that I, WILLIAM B. OWEN, a citizen of the United States, residing at Price, in the county of Carbon and State of Utah, have invented certain new and useful Improvements in Tire-Fastening Devices, of which the following is a specification, reference being had to the accompanying drawings.

My invention relates to improvements in devices for securing tires to the wheels of automobiles and other vehicles.

The object of the invention is to provide a simple and practical fastening means which will permit a tire or tire casing to be quickly and effectively clamped to a wheel rim, and which will hold it securely thereon so that there will be little or no danger of it being ripped or torn off.

With the above and other objects in view, the invention consists of the novel construction, combination and arrangement of parts, hereinafter fully described and claimed, and illustrated in the accompanying drawings in which:—

Figure 1 is a longitudinal section through a portion of a wheel rim and tire illustrating the application of my invention; Figs. 2 and 3 are cross sectional views taken on the planes indicated by the lines 2—2 and 3—3 in Fig. 1; Fig. 4 is a plan view of the inner faces of the overlapping ends of the tire clamping band; Fig. 5 is a detail view of one end of said band; Figs. 6, 7, 8 and 9, are detail views of parts of the device.

Referring more particularly to the drawings 1 denotes a wheel rim of ordinary form and construction having a channeled periphery and annular grooves or seats 1ᵃ in said periphery adjacent its side edges.

2 denotes a tire or tire casing of any suitable form and construction but preferably open on its inner face and having its edges seated in the grooves 1ᵃ and secured by my improved clamping means. The tire 2 may be distended by any suitable means but I preferably employ an annular spring member 3 which forms the subject matter of my co-pending application, Serial Number 517,880, filed September 15, 1909.

The tire clamping means which forms the subject matter of the present application comprises a fastening or clamping band 18 arranged within the tire and having overlapping ends adapted to be drawn together and secured to clamp the inner edges of the tire in the grooved rim, as shown in Figs. 2 and 3. The clamping band or member 18 is preferably constructed of a comparatively wide strip of metal and one of its overlapping ends is cut away and reduced to provide a tongue 19, on one edge of which is formed a longitudinal series of rack teeth 20. This tongue or rack 19 slides in a guide casing formed on the band 18 adjacent its other end 21 by means of a plate 22 and two spacing strips 23, the parts 21, 22, 23, being united by rivets or similar fastenings 24, as shown in Fig. 4. The rack teeth 20 mesh with the pinion 25 fixed to a short shaft 26 rotatably mounted in the end 21 of the band and the plate 22. Said pinion 25 is disposed between the end 21 and the plate 22 and its shaft 26 is of such length that it will project into an opening in the rim 1, as shown in Fig. 2, and has a squared or polygonal-shaped end 27 adapted to receive an operating key such as shown at 16 in Fig. 9. When the pinion 25 is rotated in one direction the two ends of the band 18 will be drawn together to cause the latter to clamp the tire to the rim and in order to retain the overlapped ends of the band in such position an automatic double ended dog or pawl 28 is arranged in the casing on the end 21 and mounted on a stationary pivot pin 29. One end 30 of the dog 28 engages with the rack teeth 20, and its other end 31 is resilient and co-acts with the teeth of the pinion 25, whereby said pinion may be used for both retracting the dog from engagement with the rack teeth 20, and also projecting it into engagement with the same. This is accomplished by making said end 31 of proper length and resilient, and also by rounding the extremity of said end, as shown in the drawings. It will be seen that when the pinion 25 is rotated in the direction of the arrow A in Fig. 4, the two ends of the band 18 will be drawn together and the ratchet or rack teeth 20 will be forced past the end 30 of the dog; and that when said pinion is turned in the reverse direction the teeth will engage the end 31 of the dog to retract its other end 30 from engagement with the teeth, thereby permitting movement of the ends of the band in the opposite direction.

In order to more securely retain the overlapped ends of the band in position after the band has been tightened I provide a supplemental fastening device in the form of a T-shaped bolt 32, shown more clearly in Fig. 3. This bolt has its cylindrical body portion passing through a radial opening in the rim 1 and its inner screw threaded end 33 has applied to it a washer 34 and a clamping nut 35. The outer end or head of the bolt which is disposed within the tire has oppositely extending arms 36 projecting from a reduced portion 37 of the bolt and terminating in right angularly projecting prongs 38, which latter are adapted to be passed through any one of a longitudinal series of pairs of openings 39 formed in the band 18, and through a pair of similar openings 40 formed in the end 21 of said band and adapted to be brought into register or alinement with the openings 39. The band 18 has formed centrally in it between the openings 39 a longitudinal slot 41 which receives the reduced portion 37 of said bolt and to permit of the engagement and disengagement of the bolt with the overlapped ends of the band 18 said end 21 is formed at a point midway between the openings 40 with an opening 42 of sufficient size to receive the cylindrical body portion 32 of the bolt, and a similar opening 43 is formed at one end of the slot 41. It will be seen that when the openings 42 43, are brought into register the body of the bolt 32 may be passed through them and its reduced portion 37 engaged with the slot 41. When the clamping band 18 is being tightened or loosened by rotating the pinion 25 the T-shaped bolt 32 is of course loosened so that the prongs 38 on its head are disengaged from the openings 39, 40; but when the band has been tightened as above explained and the openings 40 brought into register with a pair of the openings 39, the nut 35 is tightened to draw the bolt inwardly and cause its prongs 38 to pass through said registering openings and thereby lock the overlapped ends of the band and also securely fasten the tire casing to the rim 1.

Changes in the form, proportion, construction and arrangement of parts may be made within the spirit and scope of the invention as defined by the appended claims.

Having thus described the invention, what is claimed is:

1. The combination of a wheel rim, a flexible tire, an annular clamping band within the tire and having overlapping ends, a rack upon one end of said band, a pinion rotatably mounted on the other end of said band to mesh with said rack, and a double ended dog to co-act with both the pinion and rack.

2. The combination of a wheel rim, a flexible tire, an annular clamping band within the tire and having overlapping ends, a rack upon one end of said band, a pinion rotatably mounted on the other end of said band to mesh with said rack, and a dog pivoted intermediate of its ends on the end of the band carrying said pinion and having one end co-acting with the rack, and its other end resilient and provided with a rounded extremity to co-act with said pinion.

3. The combination of a wheel rim, a flexible tire, an annular clamping band within the tire and having overlapping ends, means for drawing the ends of said band together, one of said ends of the band being formed with spaced openings and the other being formed with a longitudinal series of spaced openings adapted to be brought into registration with the first mentioned openings, said overlapping ends of the band being also formed with openings arranged between said spaced openings, a bolt arranged radially in the rim and in the last mentioned openings in the overlapped ends of the band, said bolt having a T-shaped head with prongs to enter the spaced registering openings in the band, and a tightening means on the outer end of the bolt.

In testimony whereof I hereunto affix my signature in the presence of two witnesses.

WILLIAM BRANCH OWEN.

Witnesses:
   B. B. McDonald,
   James F. Pace.